US010255483B2

(12) United States Patent
Hushchyn et al.

(10) Patent No.: US 10,255,483 B2
(45) Date of Patent: *Apr. 9, 2019

(54) COMPUTER SYSTEMS AND COMPUTER-IMPLEMENTED METHODS SPECIALIZED IN TRACKING FACES ACROSS VISUAL REPRESENTATIONS

(71) Applicant: Banuba Limited, Wan Chai (HK)

(72) Inventors: Yury Hushchyn, Vilnius (LT); Aliaksei Sakolski, Minsk (BY); Alexander Poplavsky, Minsk (BY)

(73) Assignee: Banuba Limited, Wan Chai (HK)

(*) Notice: Subject to any disclaimer, the term of this patent is extended or adjusted under 35 U.S.C. 154(b) by 0 days.

This patent is subject to a terminal disclaimer.

(21) Appl. No.: 16/100,878

(22) Filed: Aug. 10, 2018

(65) Prior Publication Data
US 2018/0349680 A1 Dec. 6, 2018

Related U.S. Application Data

(63) Continuation of application No. 15/881,353, filed on Jan. 26, 2018, now Pat. No. 10,049,260.

(60) Provisional application No. 62/451,450, filed on Jan. 27, 2017, provisional application No. 62/451,404, filed on Jan. 27, 2017, provisional application No. 62/451,382, filed on Jan. 27, 2017, provisional application No. 62/451,328, filed on Jan. 27, 2017, provisional application No. 62/451,357, filed on Jan. 27, 2017, provisional application No. 62/451,281, filed on Jan. 27, 2017.

(51) Int. Cl.
G06K 9/00 (2006.01)
G06K 9/20 (2006.01)

(52) U.S. Cl.
CPC ..... *G06K 9/00255* (2013.01); *G06K 9/00201* (2013.01); *G06K 9/00268* (2013.01); *G06K 9/2063* (2013.01)

(58) Field of Classification Search
None
See application file for complete search history.

(56) References Cited

U.S. PATENT DOCUMENTS

| 7,912,246 B1 | 3/2011 | Moon et al. |
| 2009/0160952 A1 | 6/2009 | Nakakuki et al. |
| 2011/0141219 A1 | 6/2011 | Yeh |
| 2012/0251078 A1 | 10/2012 | Leichter et al. |
| 2012/0320500 A1 | 12/2012 | Lee et al. |

(Continued)

FOREIGN PATENT DOCUMENTS

| CN | 101141608 A | 3/2008 |
| CN | 101448085 A | 6/2009 |

OTHER PUBLICATIONS

International Search Report and Written Opinion from International Application No. PCT/IB2018/000502 dated Sep. 12, 2018.

(Continued)

*Primary Examiner* — Vikkram Bali
(74) *Attorney, Agent, or Firm* — Greenberg Traurig, LLP

(57) ABSTRACT

Embodiments directed towards systems and methods for tracking a human face present within a video stream are described herein. In some embodiments, the exemplary illustrative methods and the exemplary illustrative systems of the present invention are specifically configured to process image data to identify and align the presence of a face in a particular frame.

25 Claims, 6 Drawing Sheets

(56) References Cited

U.S. PATENT DOCUMENTS

2015/0169938 A1 6/2015 Yao et al.
2016/0156848 A1 6/2016 Jen

OTHER PUBLICATIONS

International Search Report and Written Opinion from International Application No. PCT/IB2018/000136 dated Jun. 27, 2018.

COMPUTER SYSTEMS AND COMPUTER-IMPLEMENTED METHODS SPECIALIZED IN TRACKING FACES ACROSS VISUAL REPRESENTATIONS

CROSS-REFERENCE TO RELATED APPLICATIONS

This application is a continuation of U.S. Pat. No. 10,049,260, issued Aug. 14, 2018, which claims benefit of U.S. provisional patent application Ser. No. 62/451,281 filed Jan. 27, 2017, and U.S. provisional patent application Ser. No. 62/451,328 filed Jan. 27, 2017, and U.S. provisional patent application Ser. No. 62/451,357 filed Jan. 27, 2017, and U.S. provisional patent application Ser. No. 62/451,382 filed Jan. 27, 2017, and U.S. provisional patent application Ser. No. 62/451,404 filed Jan. 27, 2017, and U.S. provisional patent application Ser. No. 62/451,450 filed Jan. 27, 2017, which are herein incorporated by reference.

FIELD OF THE INVENTION

Generally the present disclosure is directed towards systems and methods for tracking a human face present within a video stream. More specifically, the present disclosure is directed toward detecting and tracking a human face present within a video stream to perform one or more activities associated with the human face.

BACKGROUND

Detecting and tracking a human face present within a video stream is an important aspect of applications associated with portable electronic devices.

SUMMARY OF THE INVENTION

Embodiments directed towards systems and methods for tracking a human face present within a video stream are described herein. In some embodiments, a method, includes: obtaining, in real-time, by at least one processor, a real-time video stream wherein the real-time video stream comprises a plurality of frames having a visual representation of a human face of at least one person; applying, in real-time, by the at least one processor, a first face detection algorithm to detect a first presence of the human face within a first frame of the plurality of frames of the real-time video stream; wherein the first presence of the human face is defined by a first plurality of initial conditions; wherein the first plurality of initial conditions comprises: (i) a first plurality of latent variables, (ii) a first plurality of multi-dimensional points in the first frame, (iii) a coordinate system condition, identifying at least one coordinate system for a spatial orientation of the human face within the first frame of the plurality of frames; constructing, in real-time, by the at least one processor, an initial face model of the human face within the first frame of the plurality of frames based on the first plurality of initial conditions; wherein the first presence of the human face is detected once prior to constructing the initial face model; for each respective initial condition of the first plurality of initial conditions: (a) identifying, in real-time, by the at least one processor, a respective subsequent condition corresponding to the respective initial condition so as to identify a plurality of respective subsequent conditions for the first plurality of initial conditions; (b) updating, in real-time, for each respective subsequent condition of the plurality of respective subsequent conditions, by the at least one processor, the initial face model based on each respective subsequent condition so as to generate a plurality of respective updated face models; applying, in real time, by the at least one processor, a spatial filter to the plurality of respective updated face models to produce a subsequent face model of the human face; determining, in real-time, by the at least one processor, that the subsequent face model is a real-time face model when the subsequent face model is representative of the human face of the at least one person, utilizing, in real-time, by the at least one processor, the real-time face model to perform at least one activity associated with the at least one person.

In some embodiments of the method described above, the real-time video stream is a live video stream.

In some embodiments of the method described above, the real-time video stream is from a camera of a portable electronic device.

In some embodiments of the method described above, the at least one processor is the processor of the portable electronic device.

In some embodiments of the method described above, the first face detection algorithm is a normalized pixel difference algorithm.

In some embodiments of the method described above, the respective subsequent condition is the respective initial condition that has been modified in a predetermined way.

In some embodiments of the method described above, determining that the subsequent face model is representative of the human face is based on a spatial variance of multi-dimensional points in the at least one coordinate system.

In some embodiments of the method described above, the subsequent face model is not representative of the human face of the at least one person.

In some embodiments, a system includes: a portable electronic device having a camera, wherein the camera is configured to acquire a real-time video stream, wherein the real-time video stream comprises a plurality of frames having a visual representation of a human face of at least one person; and at least one processor configured to process the real-time video stream from the camera by: applying, in real-time, a first face detection algorithm to detect a first presence of the human face within a first frame of the plurality of frames of the real-time video stream; wherein the first presence of the human face is defined by a first plurality of initial conditions; wherein the first plurality of initial conditions comprises: (i) a first plurality of latent variables, (ii) a first plurality of multi-dimensional points in the first frame, (iii) a coordinate system condition, identifying at least one coordinate system for a spatial orientation of the human face within the first frame of the plurality of frames; constructing, in real-time, by the at least one processor, an initial face model of the human face within the first frame of the plurality of frames based on the first plurality of initial conditions; wherein the first presence of the human face is detected once prior to constructing the initial face model; for each respective initial condition of the first plurality of initial conditions: (a) identifying, in real-time, by the at least one processor, a respective subsequent condition corresponding to the respective initial condition so as to identify a plurality of respective subsequent conditions for the first plurality of initial conditions; (b) updating, in real-time, for each respective subsequent condition of the plurality of respective subsequent conditions, by the at least one processor, the initial face model based on each respective subsequent condition so as to generate a plurality of respective updated face models; applying, in real time, by the at least one processor, a spatial filter to the plurality of respective updated face models to produce a subsequent face model of the human face; determining, in real-time, by the at least one processor, that the subsequent face model is a real-time face model when the subsequent face model is representative of the human face of the at least one person, utilizing, in real-time, by the at least one processor, the real-time face model to perform at least one activity associated with the at least one person.

In some embodiments of the system described above, the real-time video stream is a live video stream.

In some embodiments of the system described above, wherein the real-time video stream is from a camera of a portable electronic device.

In some embodiments of the system described above, wherein the at least one processor is the processor of the portable electronic device.

In some embodiments of the system described above, wherein the first face detection algorithm is a normalized pixel difference algorithm.

In some embodiments of the system described above, wherein the respective subsequent condition is the respective initial condition that has been modified in a predetermined way.

In some embodiments of the system described above, wherein determining that the subsequent face model is representative of the human face is based on a spatial variance of multi-dimensional points in the at least one coordinate system.

In some embodiments of the system described above, wherein the subsequent face model is not representative of the human face of the at least one person.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
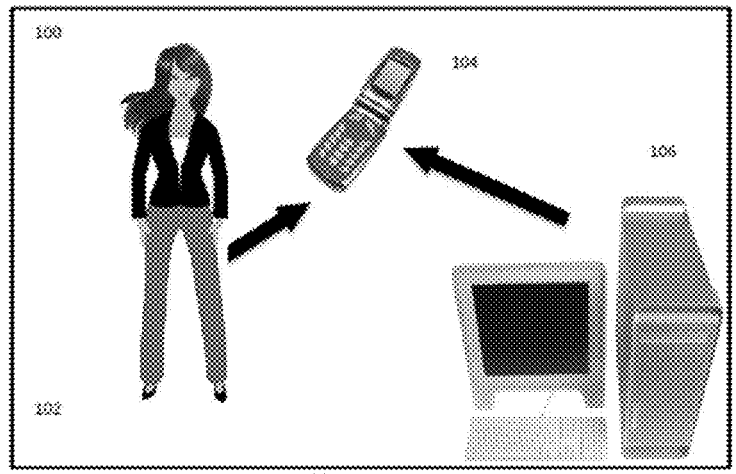
FIG. 1 illustrates an exemplary environment incorporating certain embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The present invention can be further explained with reference to the included drawings, wherein like structures are referred to by like numerals throughout the several views. The drawings shown are not necessarily to scale, with emphasis instead generally being placed upon illustrating the principles of the present invention. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention. Further, when a particular feature, structure, or characteristic is described in connection with an implementation, it is submitted that it is within the knowledge of one skilled in the art to effect such feature, structure, or characteristic in connection with other implementations whether or not explicitly described herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Objective-C, Swift, Java, Javascript). The aforementioned examples are, of course, illustrative and not restrictive.

Exemplary Non-Limiting Implementations of the Present Invention for Processing Electronic Image Data to Detect and Track Features and/or Activities of Object(s)

As used herein, the terms "image(s)" and "image data" are used interchangeably to identify data representative of visual content which includes, but not limited to, images encoded in various computer formats (e.g., ".jpg", ".bmp," etc.), streaming video based on various protocols (e.g., Real-time Streaming Protocol (RTSP), Real-time Transport Protocol (RTP), Real-time Transport Control Protocol (RTCP), etc.), recorded/generated non-streaming video of various formats (e.g., ".mov," ".mpg," ".wmv," ".avi," ".flv," ect.), and real-time visual imagery acquired through a camera application on a mobile device.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

For example, FIG. 1 illustrates an exemplary environment 100 incorporating certain embodiments of the present invention. As shown in FIG. 1, environment 100 may include a user 102, a mobile device 104 and a server 106. Other devices may also be included. For example, in some embodiments, the mobile device 104 may include any appropriate type of mobile devices, such as mobile phones, smartphones and tablets. Further, the mobile device 104 may be any appropriate device capable of taking still images or video with an equipped front camera. Further, the server 106 may include any appropriate type of server computer or a plurality of server computers for providing technical ability to perform external calculations and simulations in order to improve models used for mobile application, to store users' data or additional content for the application. For example, in some embodiments, the user 102 may interact with the mobile device 104 by means of application control(s) and one of front or back camera(s). The user 102 may be a single user or a plurality of users. Mobile device 104 and/or server 106 may be implemented on any appropriate computing circuitry platform as detailed here in.

In some embodiments, the inventive methods and the inventive systems of the present inventions can be incorporated, partially or entirely into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, visual data of the first user may be captured via a camera sensor-type imaging device or the like (e.g., a complementary metal oxide-semiconductor-type image sensor (CMOS) or a charge-coupled device-type image sensor (CCD)), without the use of a red-green-blue (RGB) depth camera and/or microphone-array to locate who is speaking. In some embodiments, an RGB depth camera and/or microphone-array might be used in addition to or as an alternative to the camera sensor. In some examples, imaging device 104 may be provided via either a peripheral eye tracking camera or as an integrated a peripheral eye tracking camera in environment 100.

Figure 2:
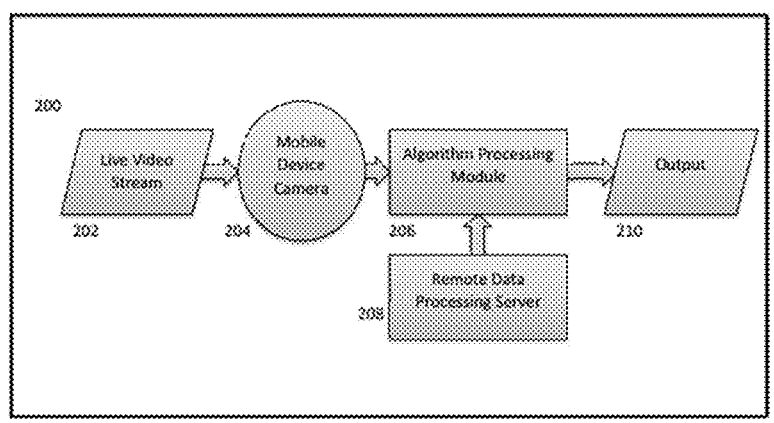
FIG. 2 illustrates a structure schematic diagram of an exemplary implementation consistent with some embodiments of the present invention.

FIG. 2 illustrates a structure schematic diagram of an exemplary implementation consistent with some embodiments of the present invention. As shown in FIG. 2, the exemplary inventive system of the present invention 200 can include an exemplary camera 204 which acquires, for example, a live video stream 202. Further, in some embodiments, the captured live video stream 202 can be then processed by an exemplary inventive algorithm module 206 which is specifically programmed in accordance with the principles of the present invention with one or more specialized inventive computer algorithms. Further, in some embodiments, the exemplary inventive algorithm module 206 can be in operational communication (e.g., wireless/wired communication) with at least one remote data processing server 208 which can be configured to support one or more functionalities of the exemplary inventive algorithm module 206. In addition, in some embodiments, the exemplary inventive system of the present invention 200 can include an output module 210. Certain components may be omitted and other components may be added. In some embodiments, a plurality of frames may be associated with the video contents and may be provided to other modules for processing. In some embodiments, a single picture may also be included for processing.

In some embodiments, the input image data (e.g., input video data) may include any appropriate type of source for video contents and may contain various video sources. In some embodiments, the contents from the input video (e.g., the video stream of FIG. 3) may include both video data and metadata. A plurality of frames may be associated with the video contents and may be provided to other modules for processing. In some embodiments, a single picture may also be included for processing.

For example, a typical movie sequence is an interleaved format of a number of camera shots, and a camera take is a continuous recorded performance with a given camera setup. Camera registration, as used herein, may refer to registration of different cameras capturing video frames in a video sequence (e.g. video stream). The concept of camera registration is based on the camera takes in reconstruction of video edits. A typical video sequence is an interleaved format of a number of camera shots, and a camera take is a continuous recorded performance with a given camera setup. By registering each camera from the incoming video frames, the original interleaved format can be separated into a number of sequences with each sequence corresponding to a registered camera that is aligned to the original camera setup.

Figure 3:
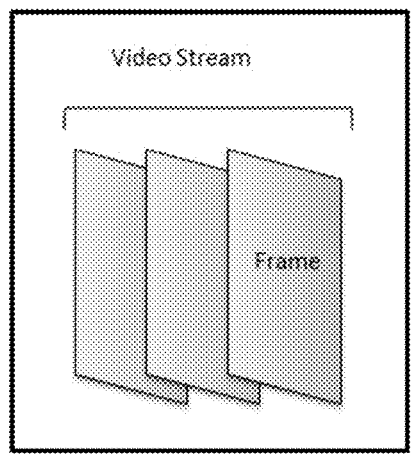
FIG. 3 illustrates an exemplary input video stream divided into frames consistent with some embodiments of the present invention.

As shown in FIG. 3, an exemplary input video stream captured by the exemplary camera (e.g., a front camera of a mobile personal smartphone) can be divided into frames. Each frame may contain an image data with any known color model, including but not limited to: YCrCb, RGB, LAB, etc.

In some embodiments, for example, the exemplary algorithm processing module 206, programmed in accordance with the present invention can include or be operationally connected to a graphics subsystem, such as, but not limited to, a graphics processing unit (GPU) or a visual processing unit (VPU), which may perform processing of images such as still or video for display. In some embodiments, analog and/or digital interfaces may be used to communicatively couple the exemplary graphics subsystem and a display. For example, the interface may be any of a High-Definition Multimedia Interface (HDMI), DisplayPort, wireless HDMI, and/or wireless high definition (HD) compliant techniques. In some embodiments, the exemplary graphics subsystem may be integrated into a processor or a chipset. In some implementations, the exemplary graphics subsystem may be a stand-alone card communicatively coupled to the chipset.

In some embodiments, the exemplary algorithm processing module 206 and the exemplary remote data processing server 208 can communicate via one or more radios modules capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, one or more radios modules may operate in accordance with one or more applicable standards in any version.

In various implementations, the output 210 can include a display which may include any television type monitor or display. In various implementations, the display may include, for example, a computer display screen, touch screen display, video monitor, television-like device, and/or a television. In various implementations, the display may be one of digital or analog. In various implementations, the display may be a holographic display. In various implementations, the display may be a transparent surface that may receive a visual projection. In some embodiments, such projections may convey various forms of information, images, and/or objects. For example, such projections may be a visual overlay for a mobile augmented reality (MAR) application. In some embodiments, under the control of one or more software applications programmed in accordance with one or more principles detailed herein, the exemplary inventive system 200 may cause to display a specifically programmed graphical user interface utilized to show data associated with the exemplary output 210 on the exemplary display.

While some illustrative examples of the present inventions detailed herein are directed to various methods and systems to detect and process various features of a human face (e.g., face detection, etc.) and associated activities (e.g., eye movement, head movement, etc.), it is understood by a skilled artisan that such examples are merely illustrative in nature and are not limiting (e.g., other parts of a human subject can be analyzed in accordance with one or more principles of the present invention; non-human objects can be detected and tracked). Consequently, the term "object" as used herein can be a live subject (e.g., a human or an animal), a physical object (e.g., car, building, etc.), a virtual-world character, or a virtual-world physical object.

Illustrative Examples of Principles of Present Invention Based on Face Detection and Face Alignment Tasks In some embodiments, the exemplary illustrative methods and the exemplary illustrative systems of the present invention are specifically configured to utilize one or more recognition algorithms that are based on the combination of face detection and face alignment tasks. In some embodiments, the exemplary illustrative methods and the exemplary illustrative systems of the present invention are specifically configured to process the image data (e.g., video frames) by starting with the face detection algorithm that identifies the presence of a face in a particular frame. In some embodiments, the exemplary illustrative methods and the exemplary illustrative systems of the present invention are specifically configured to reduce machine time and/or processing resources which would be used for the face detection and/or face alignment tasks.

In some embodiments, the exemplary illustrative methods and the exemplary illustrative systems of the present invention are specifically configured to utilize one or more face alignment algorithms for both the face detection and face alignment tasks. In some embodiments, the exemplary illustrative methods and the exemplary illustrative systems of the present invention are specifically configured to improve performance, accuracy and robustness. In some embodiments, the exemplary illustrative methods and the exemplary illustrative systems of the present invention are specifically configured to reduce overall complexity in contrast to typical processes of face detection and/or face alignment.

For example, in some embodiments, the exemplary algorithm processing module 206, which can be programmed to perform both the face detection and face alignment tasks, may reside within a suitable electronic device, such as, but not limited to, a smartphone or a TV, or outside the suitable electronic device depending on particular applications.

In some embodiments, for the face detection task, the exemplary illustrative methods and the exemplary illustrative systems of the present invention are specifically configured to run one or more of the face alignment algorithms with a specific set of initial parameters as part of the face detection task.

In some embodiments, for the face detection task, the exemplary illustrative methods and the exemplary illustrative systems of the present invention are specifically configured to allow the face detection in arbitrary environments, including, but not limited to, various perspectives, rotations, backgrounds, and/or lighting conditions.

Figure 4:
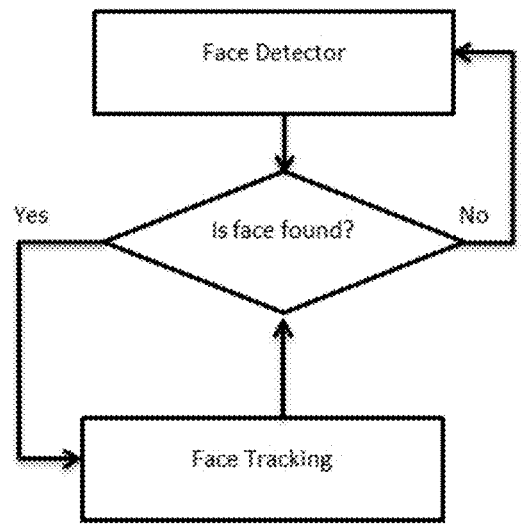
FIG. 4 illustrates a structure schematic diagram of an exemplary implementation consistent with some embodiments of the present invention.
Figure 5:
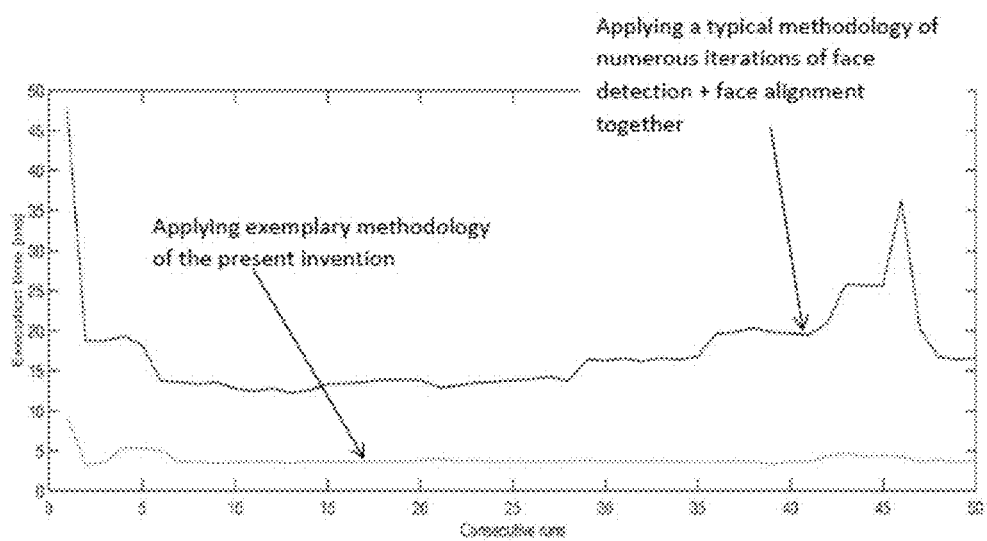
FIG. 5 depicts a table illustrating execution time versus consecutive runs for an exemplary methodology of the present invention and a typical methodology.

In some embodiments, for the face detection task, as shown in FIG. 4, the exemplary illustrative methods and the exemplary illustrative systems of the present invention are specifically configured to apply one or more face detection algorithms once to an initial (first) frame of a set of frames, in which image data (e.g., video stream) has been divided into (e.g. as shown in FIG. 3), to initially detect at least one region-of-interest (ROI) within which at least one face may be present.

In some embodiments, one or more face detection algorithms utilized by the present invention can be algorithms described in Liao et al., *Unconstrained Face Detection, Technical Report MSU-CSE* (2012). However, in the present invention some modifications of the algorithm described in Liao are implemented. The first version of the inventive face detection algorithm is used for the full scan, where one or several faces are searched within the full screen area. The second modification is fast algorithm used for quick search, in which the ROI is smaller and may be taken as the ROI from the previous frame. The number of points used for feature selection may be less than or equal to the number used by the original algorithm of Liao. In some embodiments, one or more face detection algorithms used for initial face detection may be based on Viola et al., *Jones Rapid Object Detection using a Boosted Cascade of Simple Features*, Conference on Computer Vision and Pattern Recognition (2001). In some embodiments, one or more face detection algorithms utilized by the present invention can be any other similarly suitable face detection algorithm.

In some embodiments, for the face tracking tasks, as shown in FIG. 4, after the at least one face is detected within the initial frame, the exemplary illustrative methods and the exemplary illustrative systems of the present invention are specially configured to switch to the face tracking mode, using the position of the head from the previous image as an initial approximation. If the exemplary illustrative systems of the present invention detect that the face is lost, the systems switch back to the face detection mode. In some embodiments, another incorporated model, such as a linear regression or a double exponential smoothing prediction, for example, as used herein, can forecast the appearance of the head in the subsequent frame, increasing stability and precision. In some embodiments, exemplary illustrative systems of the present invention may employ exponential smoothing which assigns exponentially decreasing weights as the observation get older. In some embodiments, exemplary illustrative systems of the present invention may employ double exponential smoothing which uses two constants and is better at handling trends.

Table 1 provides an illustrative example of applying an exemplary face alignment algorithm with convergence for the face detection task on the subsequent frames in the set after processing the initial frame.

TABLE 1

Algorithm: Exemplary algorithm of the present invention for Face Tracking

Input: Set of frames in video sequence
Output: Real-time Face Model
Run initial Face Detector
Construct initial Face Model
For each Frame
    For Initial Condition in Initial Conditions
        Update each Face Model based on the Initial Condition
    end
    Apply Spatial Filter for the Updated Face Models => Get refined Face
Model
    if Face Models not Converge
        Run Face Detector
        Build Face Model
    end
end In some embodiments, as used herein (e.g. in Table 1), the term "face model" means a model of a human's face constructed algorithmically based on at least one human's image either in the real-time or not in the real-time. In some embodiments, the face model may be a two-dimensional model of a human face consisting of a number of points in two-dimensional screen coordinates, or a three-dimensional model of a human face consisting of a number of points in three dimensional screen, model, or world coordinates, or a two- or a three-dimensional model defined by a set of latent variables (e.g., attitude quaternions, position, scale, mimics, anthropometrics PCA coefficients), or a combination of the described above.

An initial face detector process is run during the initialization of an exemplary algorithm, such as a normalized pixel difference algorithm. Normalized pixel difference is described in Liao et al., *A Fast and Accurate Unconstrained Face Detector*, IEEE Transactions on Pattern Analysis and Machine Intelligence, Volume 38, Issue 2, pp. 211-223, February 2016. As used herein, for example in Table 1, the term "initial condition" refers to a number of variables and/or parameters, which are used as an input for the exemplary illustrative methods and the exemplary illustrative systems of the present invention in order to produce the face model. Such variables and/or parameters may include latent variables (e.g. attitude quaternions, positional coordinates, scale, mimics and anthropometrics PCA coefficients, etc.), two-dimensional or three-dimensional points in screen, world or model coordinate systems. Such variables and/or parameters may be defined as the output variables and/or parameters of the previous frame. The initial condition used in Table 1 may include the set of variables and/or parameters from the previous frame modified in a predefined way, for example, by varying the coordinates in the model coordinate system. The initial condition is the total set of all initial conditions, wherein each initial condition is modified as described above. In some embodiments, varying the initial conditions allows for the reduction in jitter in the visual representation of the resulting face model. The initial conditions are varied in order to obtain several uncorrelated solutions instead of a single one. That approach provides more robust average result reducing noise introduced by each instance. As used herein, the term "predefined way" means that the pattern of changing the initial conditions are defined and known before running the anti jitter methodology as further described below. For example, translates tx and ty are shifted by some steps for each instance Applying spatial filter for the updated face models means any methods or algorithms designed to refine the resulting face model based on the separate instances of the updated face models determined by the exemplary illustrative methods and the exemplary illustrative systems of the present invention based on the modified initial conditions. The examples of such spatial filter may be maximal likelihood principle, mean filter, median filter, quantille filter, particle filter, etc. The convergence in Table 1 means any indicator of the consistency of the updated face models which shows that the resulting face model adequately represents the visual appearance of the human's face. An example of such an indicator may be a spatial variance of two-dimensional points in the screen coordinate system. For example, such points may be IBUG-68 landmarks. In some embodiments, a standard deviation for the spatial variance is a standard deviation of two-dimensional facial landmark points measured in screen coordinates for a video consisting of the same frame (i.e. one frame with a human's face multiply replicated)

Illustrative Examples of Principles of Present Invention Based on Applying Anti-Jittering Methodology In some embodiments, during the face detection task, the exemplary illustrative methods and the exemplary illustrative systems of the present invention are specifically configured to address uncorrelated errors which might be generated as part of the exemplary projection of the face model to two-dimensional screen coordinates while processing of the image data (e.g., video stream) detailed above. In some embodiments, the exemplary illustrative methods and the exemplary illustrative systems of the present invention are specifically configured to apply the "anti-jitter" methodology to deal with the uncorrelated errors. In some embodiments, during the video streaming, these errors can lead to random changes in coordinates of the two-dimensional projected face model points, which can be observed as a continuous "shaking" of the projected points.

In some embodiments, as detailed above the face alignment algorithm is executed several times during the face detection task. In some embodiments, the face alignment algorithm is executed at least 5 times. In some embodiments, the face alignment algorithm is executed at most 25 times. In some embodiments, the face alignment algorithm is executed 5 to 25 times. In some embodiments, the face alignment algorithm is executed 10 to 25 times. In some embodiments, the face alignment algorithm is executed 15 to 25 times. In some embodiments, the face alignment algorithm is executed 20 to 25 times. In some embodiments, the face alignment algorithm is executed 5 to 20 times. In some embodiments, the face alignment algorithm is executed 5 to 15 times. In some embodiments, the face alignment algorithm is executed 5 to 10 times.

In some embodiments, the exemplary illustrative methods and the exemplary illustrative systems of the present invention are specifically configured to non-linearly transform the initial conditions, which may be defined as output variables and/or parameters of the face model of the previous frame shifted by some predefined values and used as inputs for the face model at the current frame. In some embodiments, after each transformation, results of each execution of the exemplary face alignment algorithm are refined by a spatial filter as defined above. Since the execution of the face alignment algorithm is based, at least in part, on the local binary features, this approach neither overcomplicates the overall algorithm, nor leads to a noticeable increase in execution time, but at the same time gives a significant advantage in terms of the jitter reduction. For example, while applying the anti-jitter methodology may result in an increased number of runs (e.g., by a factor of 2, 3, 4, 5, 6, 7, 8, etc.), an average loss in the performance rises insignificantly and in non-liner way (e.g., if the run count equals N, the execution time rises by a factor lesser than N). For example, when the number of runs of the face alignment algorithm increased by a factor of 6, the average time for processing of each frame increases only by a factor of 1.5 (e.g., from 20 ms to 30 ms).

Table 2 provides an illustrative example of applying an exemplary anti-jittering processing of the present invention.

TABLE 2

Algorithm: Anti-Jitter

Input: A frame in video sequence
Output: Refined Face Model
For Initial Condition in Initial Conditions
    Update each Face Model based on the Initial Condition
end
Apply Spatial Filter for the Updated Face Models => Get refined Face Model In some embodiments, a method consistent with the present invention, utilizing the anti jiggering methodology comprises: obtaining, in real-time, by at least one processor, a real-time video stream wherein the real-time video stream comprises a plurality of frames having a visual representation of a human face of at least one person; applying, in real-time, by the at least one processor, a first face detection algorithm to detect a first presence of the human face within a first frame of the plurality of frames of the real-time video stream; wherein the first presence of the human face is defined by a first plurality of initial conditions; wherein the first plurality of initial conditions comprises: (i) a first plurality of latent variables, (ii) a first plurality of multi-dimensional points in the first frame, (iii) a coordinate system condition, identifying at least one coordinate system for a spatial orientation of the human face within the first frame of the plurality of frames; constructing, in real-time, by the at least one processor, an initial face model of the human face within the first frame of the plurality of frames based on the first plurality of initial conditions; wherein the first presence of the human face is detected once prior to constructing the initial face model; repeating, by the at least one processor, in real-time, X number of times the following: for each respective initial condition of the first plurality of initial conditions: (a) identifying a respective subsequent condition corresponding to the respective initial condition so as to identify a plurality of respective subsequent conditions for the first plurality of initial conditions; (b) updating, for each respective subsequent condition of the plurality of respective subsequent conditions, the initial face model based on each respective subsequent condition so as to generate a plurality of respective updated face models; (c) applying a spatial filter to the plurality of respective updated face models to produce a subsequent face model of the human face; wherein X is at least 2 times; determining, in real-time, by the at least one processor, that the subsequent face model is a real-time face model when the subsequent face model is representative of the human face of the at least one person, utilizing, in real-time, by the at least one processor the real-time face model to perform at least one activity associated with the at least one person. In some embodiments, X is one of: 4 times, 6 times, 8 times, or 10 times.

In some embodiments, a system consistent with the present invention, utilizing the anti jiggering methodology comprises: a portable electronic device having a camera, wherein the camera is configured to acquire a real-time video stream, wherein the real-time video stream comprises a plurality of frames having a visual representation of a human face of at least one person; and at least one processor configured to process the real-time video stream from the camera by: applying, in real-time, a first face detection algorithm to detect a first presence of the human face within a first frame of the plurality of frames of the real-time video stream; wherein the first presence of the human face is defined by a first plurality of initial conditions; wherein the first plurality of initial conditions comprises: (i) a first plurality of latent variables, (ii) a first plurality of multi-dimensional points in the first frame, (iii) a coordinate system condition, identifying at least one coordinate system for a spatial orientation of the human face within the first frame of the plurality of frames; constructing, in real-time, an initial face model of the human face within the first frame of the plurality of frames based on the first plurality of initial conditions; wherein the first presence of the human face is detected once prior to constructing the initial face model; repeating, in real-time, X number of times the following: for each respective initial condition of the first plurality of initial conditions: (a) identifying a respective subsequent condition corresponding to the respective initial condition so as to identify a plurality of respective subsequent conditions for the first plurality of initial conditions; (b) updating, for each respective subsequent condition of the plurality of respective subsequent conditions, the initial face model based on each respective subsequent condition so as to generate a plurality of respective updated face models; (c) applying a spatial filter to the plurality of respective updated face models to produce a subsequent face model of the human face; wherein X is at least 2 times; determining, in real-time, by the at least one processor, that the subsequent face model is a real-time face model when the subsequent face model is representative of the human face of the at least one person, utilizing, in real-time, by the at least one processor the real-time face model to perform at least one activity associated with the at least one person. In some embodiments, X is one of: 4 times, 6 times, 8 times, or 10 times.

Figure 6:
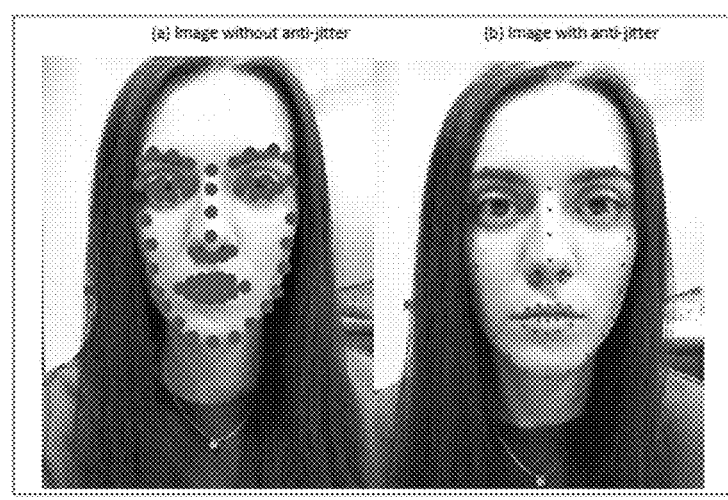
FIG. 6 illustrates a comparison of face detection images that are processed consistent with and without some embodiments of the present invention.

FIG. 6 shows a comparison of face detection images that are processed with and without applying the anti-jittering methodology of the present invention. The images shown in FIG. 6 were processed from a streaming video taken with a frontal camera of an iPhone-6s and are marked with 64 facial landmark points in accordance with IBUG-68 detection processing. In FIG. 6, a diameter of circles illustrates $2\sigma$ errors in positions of the landmark points. In some embodiments, the exemplary illustrative methods and the exemplary illustrative systems of the present invention are specifically configured to determine when to apply the anti-jittering algorithm by, for example, testing for stability a number of landmark points. The spatial variation of two-dimensional landmark points is measured using synthetic video streams consisting of single replicated frames which allows for exclusion of the effects of camera and/or face motion. In some embodiments, the exemplary illustrative methods and the exemplary illustrative systems of the present invention are specifically configured for testing based on at least 21 landmark points. In some embodiments, the exemplary illustrative methods and the exemplary illustrative systems of the present invention are specifically configured for testing based on at least 25 landmark points. In some embodiments, the exemplary illustrative methods and the exemplary illustrative systems of the present invention are specifically configured for testing based on at least 15 landmark points. In some embodiments, the exemplary illustrative methods and the exemplary illustrative systems of the present invention are specifically configured for testing based on at least 20 landmark points. In some embodiments, the exemplary illustrative methods and the exemplary illustrative systems of the present invention are specifically configured for testing based on at least 30 landmark points. In some embodiments, the exemplary illustrative methods and the exemplary illustrative systems of the present invention are specifically configured for testing based on between 21 and 64 landmark points. In some embodiments, the exemplary illustrative methods and the exemplary illustrative systems of the present invention are specifically configured for testing based on 64 landmark points.

Figure 7:
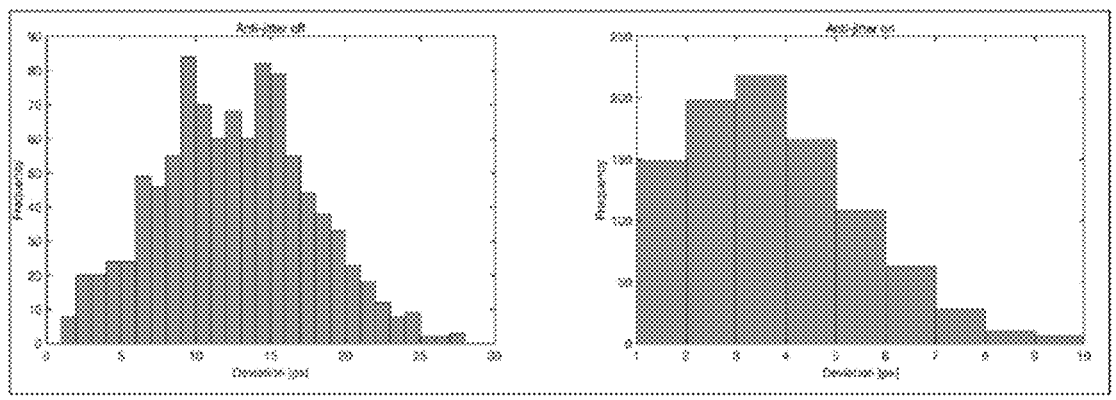
FIG. 7 illustrates a comparison of distribution functions of consecutive shifts of a landmark processed consistent with and without some embodiments of the present invention.

FIG. 7 shows a comparison of distribution functions of consecutive shifts (in pixels) of the landmark #2 (IBUG-68) when processing in accordance with the present invention without and with the anti jitter processing.

Figure 8:
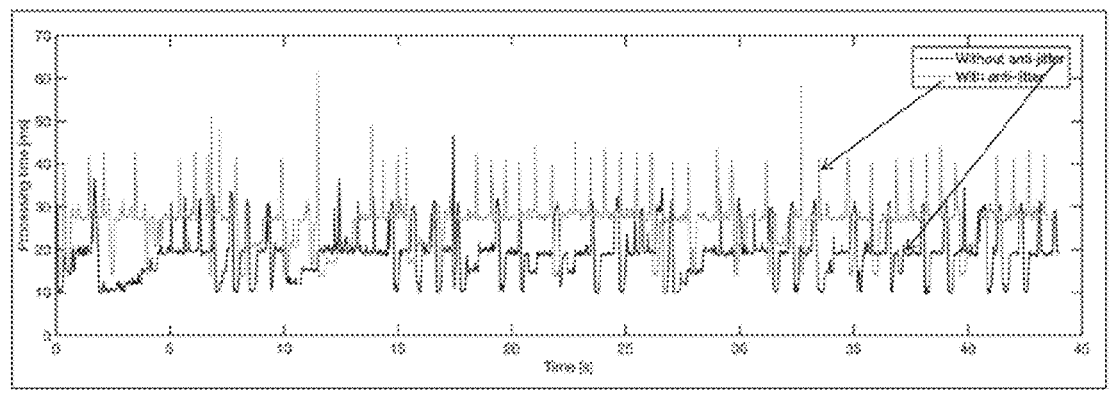
FIG. 8 depicts a table illustrating time required for processing each frame plotted as a function of the time counted from 10 seconds after the application of an exemplary methodology of the present invention.

FIG. 8 illustrates a performance of the anti jitter algorithm. The time required for processing each frame is plotted as a function of the time counted from 10 seconds after the application of the anti jitter algorithm begins.

Illustrative Examples of Principles of Present Invention Based on Applying Asymmetric Cascades Methodology In some embodiments, during the face detection task, the exemplary illustrative methods and the exemplary illustrative systems of the present invention are specifically configured to improve the face model in a cascaded manner where the regression models consequentially update the previous face model into a new one with varied parameters of regressors at each cascade. In some embodiments, as used herein, terms "cascade," "cascades," "cascades algorithm," and alike, refer to a numerical method for calculating function values of the basic scaling and wavelet functions of a discrete wavelet transform using an iterative process that starts from values on a coarse sequence of sampling points and produces values for successively more densely spaced sequences of sampling points.

In some embodiments, the exemplary illustrative methods and the exemplary illustrative systems of the present invention are specifically configured to utilize regression models, or regressors, that refer to a combination of at least two or more machine learning algorithms (e.g. a combination of random forest and linear regression) that uses local binary features to predict the increments in latent variables (or any other variables, like 2D or 3D landmark points). The optimal choice of regressor parameters at each cascade is achieved by using distributed asynchronous hyperparameter processing and including a penalty constraint to the loss function while training the model by predicting a shape increment and applying the predicated shape increment to update the current estimated shape of the human face in the next sequential frame. In one example, applying the asymmetric cascades methodology, allows reducing a model size by a factor of X (e.g., 2, 3, 4, 5, 6, etc.).

In some embodiments, the exemplary illustrative methods and the exemplary illustrative systems of the present invention are specifically configured to adjust the calculation of the face model at each cascade using equation (1):

$$FM^c = FM^{c-1} + R^c(I, FM^{c-1}, \Phi^c, W^c, P^c), c=1, \ldots, C, \quad (1)$$

where $FM^c$ is a face model at c-th cascade (the face model is a model of a human's face constructed algorithmically based on at least one human's image either in the real-time or not in the real-time. The face model may be a two-dimensional model consisting of a number of points in two-dimensional screen coordinates, or a three-dimensional model consisting of a number of points in three dimensional screen, model, or world coordinates, or a two-dimensional or a three-dimensional model defined by a set of latent variables (e.g., attitude quaternions, position, scale, mimics, anthropometrics PCA coefficients), or a combination of the variable described above.),
$R^c$ is a regressor function (e.g. a combination of the random forest and linear regressions),
I is an image,
$\Phi^c = [\phi_1^c, \phi_2^c, \ldots, \phi_L^c]$ is the local feature mapping function (i.e. the local descriptor, e.g., based on the random forest). Each local feature $\phi_L^c$, is learned by independently regressing the Lth landmark in the corresponding local region. To learn each $\phi_L^c$, ensemble trees based regression is used to induce binary features. The binary features encode the intrinsic structure in a local region, for predicating the landmark position. After concatenating all local binary features to form the feature mapping, $W^c$ is discriminatively learned for global shape estimation.
$W^c = [w_1^c, w_2^c, \ldots, w_L^c]$ is the linear regression matrix (i.e. the global descriptor), learned by the linear regression at the second step when the local feature mapping function is known, $P^c$ is a set of random forest and/or liner regression parameters (e.g. D and N for the random forest) externally determined by way of the distributed asynchronous hyperparameter training algorithm. A hyperparameter optimization algorithm is the algorithm for choosing a set of optimal hyperparameters for a learning algorithm. The same kind of machine learning model can require different constraints, weights or learning rates to generalize different data patterns. These measures are called hyperparameters, and have to be tuned so that the model can optimally solve the machine learning problem. Hyperparameter optimization finds a tuple of hyperparameters that yields an optimal model which minimizes a predefined loss function on given independent data. The objective function takes a tuple of hyperparameters and returns the associated loss.

For example, during some step of the regression $R^c$, the target for learning is:

$$\min_{w_l^c, \phi_l^c} \sum_t \|\Delta G_l(\Delta S_t^c) - R_l^c(I, S_t^{c-1}, w_l^c, \phi_l^c)\|_2^2, \quad (2),$$

where "t" is a test sample and $\Delta G$ is the ground truth offset of a latent variable, or two- or three-dimensional landmark point and where $\Delta S_t^c$ is the shape increment at the c-th cascade. Combining the local features to the mapping function $\Phi^c$, we learned $W^c$ by minimizing the following function:

$$\min_{W^c} \sum_t \|\Delta S_t^c - R^c(I, S_t^{c-1}, W^c, \Phi^c)\|_2^2 + \lambda \|W^c\|_2^2, \quad (3),$$

where the second term is L2 regularization. Typically the dimensionality of features is very high. For example, for 68 landmarks, the dimensionality of $\Phi^c$ could be 100K+. Additionally, substantial overfitting may occur. In some embodiments, exemplary methods of the present disclosure use L2 regularization to address the above issue.

In some embodiments, prior to the run of the main algorithm, the Pc is determined by utilizing an external algorithm. In some embodiments, Pc is determined in at least one of the following ways:
1) a model size is fixed ($2^{D-1} \times N \times L \times C$=const) and an error at the last cascade is minimized; and
2) an error below a given threshold is fixed and the model size is determined for best execution.

As shown above, the model size can be considerably large, as its complexity rises steeply with the number (N) and depth of the trees (D) in random forest, the number of landmarks (L) and cascades (C).

In some embodiments, $P^c$ is determined from the nonlinear behavior of the fitting error from one cascade to another. For example, when a particular parameter of the regressor is reduced by a particular factor at the first cascade (e.g., N reduced by 2) and then increase the particular parameter by the same quantity only at the final cascade, the determination would not lead to an increase in the resulting objective error, while the model size would be reduced considerably.

Figure 9:
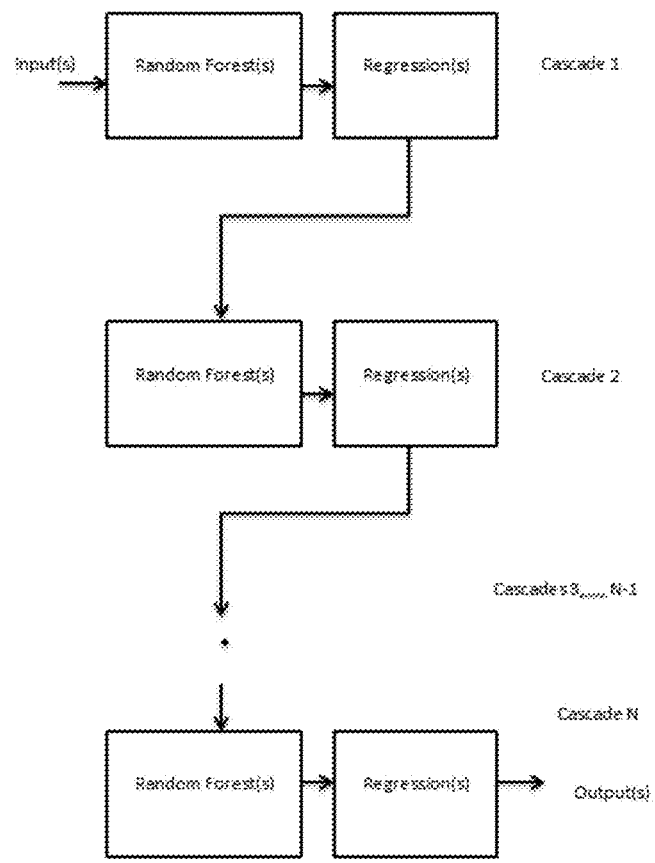
FIG. 9 shows a flowchart of an exemplary application of the asymmetric cascades algorithm consistent with some embodiments of the present invention.

FIG. 9 shows a flowchart of an exemplary application of the asymmetric cascades algorithm. Each cascade may consist of a pair of classifiers: e.g., random forest and liner regression. Random forest classifier processes the local binary features which are fast and can be calculated with low cost. The output(s) of the random forests are than sent to the linear regression. Each cascade updates the face model by predicting its variables based on the variables sent to it from the previous cascade and the current local binary feature calculation. The initial (first) cascade uses the information (variables) left from the previous frame. Such a set of variables may include (but not limited to) latent variables (e.g., attitude defined by quaternions or Euler angles; position and scale in model, world or screen coordinate system, or any other suitable system of coordinates; head anthropometric, mimics, etc. coefficients), two- or three-dimensional head or face points (landmarks) or a combination of thereof. Each cascade may update either the full face model or a part of it. Each cascade may update the face model not in the same way as other cascades.

In some embodiments, the distributed asynchronous hyperparameter algorithm is a loss function in a graph-structured configuration space, i.e. over a process for drawing valid samples. In some embodiments, the distributed asynchronous hyperparameter algorithm is based on a random search method of drawing hyperparameter assignments and evaluating them. Table 3 shows a comparison of exemplary results from the application of the asymmetric cascades algorithm of the present invention to results obtained utilizing a classical model with D=4, N=12. Therefore, the model size decreases (as defined by the estimate above) by a factor of 3.7. The error is defined in unit of interpupillary distance at Q95% for the landmark points.

TABLE 3

| | Classic Algorithm | | | Asymmetric Cascades | | |
|---|---|---|---|---|---|---|
| c | N | D | error | N | D | error |
| 1 | 12 | 4 | —[1] | 2 | 3 | 0.167 |
| 2 | 12 | 4 | —[1] | 4 | 3 | 0.133 |
| 3 | 12 | 4 | —[1] | 7 | 3 | 0.110 |
| 4 | 12 | 4 | —[1] | 6 | 3 | 0.096 |
| 5 | 12 | 4 | —[1] | 7 | 3 | 0.088 |
| 6 | 12 | 4 | —[1] | 7 | 3 | 0.077 |
| 7 | 12 | 4 | 0.090 | 12 | 3 | 0.070 |

[1] a final error is calculated for the Classic Algorithm.

In some embodiments, a method consistent with the present invention, utilizing the cascade methodology comprises: obtaining, in real-time, by at least one processor, a real-time video stream wherein the real-time video stream comprises a plurality of frames having a visual representation of a human face of at least one person; applying, in real-time, by the at least one processor, a first face detection algorithm to detect a first presence of the human face within a first frame of the plurality of frames of the real-time video stream; wherein the first presence of the human face is defined by a first plurality of initial conditions; wherein the first plurality of initial conditions comprises: (i) a first plurality of latent variables, (ii) a first plurality of multi-dimensional points in the first frame, (iii) a coordinate system condition, identifying at least one coordinate system for a spatial orientation of the human face within the first frame of the plurality of frames; constructing, in real-time, by the at least one processor, an initial face model of the human face within the first frame of the plurality of frames based on the first plurality of initial conditions; wherein the first presence of the human face is detected once prior to constructing the initial face model; identifying, in real-time, by the at least one processor, a plurality of initial local features associated with each landmark of a plurality of landmarks on the initial face model of the human face by: utilizing a first regression learning algorithm to learn an initial local feature mapping function corresponding to a respective initial local feature of the plurality of initial local features associated with a respective landmark of the plurality of landmarks, wherein the first regression learning algorithm is based on the first frame and the initial face model; wherein each initial local feature is encoded based on a plurality of variables whose values are determined by a distributed asynchronous hyperparameter training algorithm; utilizing a second regression learning algorithm to learn a global feature mapping function corresponding to the plurality of landmarks based at least in part on a plurality of initial local feature mapping functions associated with the plurality of initial local features corresponding to the plurality of landmarks; for each respective initial condition of the first plurality of initial conditions: (a) identifying, in real-time, by the at least one processor, a respective subsequent condition corresponding to the respective initial condition so as to identify a plurality of respective subsequent conditions for the first plurality of initial conditions; (b) updating, in real-time, for each respective subsequent condition of the plurality of respective subsequent conditions, by the at least one processor, the initial face model based on each respective subsequent condition so as to generate a plurality of respective updated face models; applying, in real time, by the at least one processor, a spatial filter to the plurality of respective updated face models to produce a subsequent face model of the human face; identifying, in real-time, by the at least one processor, a plurality of subsequent local features associated with each landmark of the plurality of landmarks on the subsequent face model of the human face by: utilizing the first regression learning algorithm to learn at least one subsequent local feature mapping function corresponding to a respective subsequent local feature of the plurality of subsequent local features associated with the respective landmark of the plurality of landmarks, wherein the first regression learning algorithm is based on a subsequent frame and the initial face model; wherein each initial local feature is encoded based on a plurality of variables whose values are determined by the distributed asynchronous hyperparameter training algorithm; wherein the plurality of the subsequent local features are less than the plurality of initial local features by a factor of X; utilizing the second regression learning algorithm to learn the subsequent global feature mapping function corresponding to the plurality of landmarks based at least in part on a plurality of subsequent local feature mapping functions associated with the plurality of subsequent local features corresponding to the plurality of landmarks; updating the subsequent face model based on the subsequent global feature mapping function; determining, in real-time, by the at least one processor, that the subsequent face model is a real-time face model when the subsequent face model is representative of the human face of the at least one person, utilizing, in real-time, by the at least one processor, the real-time face model to perform at least one activity associated with the at least one person. In some embodiments, the first regression learning algorithm is a random tree algorithm. In some embodiments, X is one of 2, 3, 4, 5, or 6.

In some embodiments, a system consistent with the present invention, utilizing the cascade methodology comprises: a portable electronic device having a camera, wherein the camera is configured to acquire a real-time video stream, wherein the real-time video stream comprises a plurality of frames having a visual representation of a human face of at least one person; and at least one processor configured to process the real-time video stream from the camera by: applying, in real-time, by the at least one processor, a first face detection algorithm to detect a first presence of the human face within a first frame of the plurality of frames of the real-time video stream; wherein the first presence of the human face is defined by a first plurality of initial conditions; wherein the first plurality of initial conditions comprises: (i) a first plurality of latent variables, (ii) a first plurality of multi-dimensional points in the first frame, (iii) a coordinate system condition, identifying at least one coordinate system for a spatial orientation of the human face within the first frame of the plurality of frames; constructing, in real-time, by the at least one processor, an initial face model of the human face within the first frame of the plurality of frames based on the first plurality of initial conditions; wherein the first presence of the human face is detected once prior to constructing the initial face model; identifying, in real-time, by the at least one processor, a plurality of initial local features associated with each landmark of a plurality of landmarks on the initial face model of the human face by: utilizing a first regression learning algorithm to learn an initial local feature mapping function corresponding to a respective initial local feature of the plurality of initial local features associated with a respective landmark of the plurality of landmarks, wherein the first regression learning algorithm is based on the first frame and the initial face model; wherein each initial local feature is encoded based on a plurality of variables whose values are determined by a distributed asynchronous hyperparameter training algorithm; utilizing a second regression learning algorithm to learn a global feature mapping function corresponding to the plurality of landmarks based at least in part on a plurality of initial local feature mapping functions associated with the plurality of initial local features corresponding to the plurality of landmarks; for each respective initial condition of the first plurality of initial conditions: (a) identifying, in real-time, by the at least one processor, a respective subsequent condition corresponding to the respective initial condition so as to identify a plurality of respective subsequent conditions for the first plurality of initial conditions; (b) updating, in real-time, for each respective subsequent condition of the plurality of respective subsequent conditions, by the at least one processor, the initial face model based on each respective subsequent condition so as to generate a plurality of respective updated face models; applying, in real time, by the at least one processor, a spatial filter to the plurality of respective updated face models to produce a subsequent face model of the human face; identifying, in real-time, by the at least one processor, a plurality of subsequent local features associated with each landmark of the plurality of landmarks on the subsequent face model of the human face by: utilizing the first regression learning algorithm to learn at least one subsequent local feature mapping function corresponding to a respective subsequent local feature of the plurality of subsequent local features associated with the respective landmark of the plurality of landmarks, wherein the first regression learning algorithm is based on a subsequent frame and the initial face model; wherein each initial local feature is encoded based on a plurality of variables whose values are determined by the distributed asynchronous hyperparameter training algorithm; wherein the plurality of the subsequent local features are less than the plurality of initial local features by a factor of X; utilizing the second regression learning algorithm to learn the subsequent global feature mapping function corresponding to the plurality of landmarks based at least in part on a plurality of subsequent local feature mapping functions associated with the plurality of subsequent local features corresponding to the plurality of landmarks; updating the subsequent face model based on the subsequent global feature mapping function; determining, in real-time, by the at least one processor, that the subsequent face model is a real-time face model when the subsequent face model is representative of the human face of the at least one person, utilizing, in real-time, by the at least one processor, the real-time face model to perform at least one activity associated with the at least one person. In some embodiments, the first regression learning algorithm is a random tree algorithm. In some embodiments, X is one of 2, 3, 4, 5, or 6.

Illustrative Examples of Principles of Present Invention Based on Utilizing 3D Modelling for Object Alignment While some illustrative examples of the present inventions detailed herein are directed to various methods and systems to utilize 3D modeling for alignment of a human face within one or more region of interests within visual image (e.g., a frame of streaming video), it is understood by a skilled artisan that such examples are merely illustrative in nature and are not limiting (e.g., other parts of a human subject can be analyzed in accordance with one or more principles of the present invention; non-human objects can be similarly aligned). Consequently, the term "object" as used herein can be a live subject (e.g., a human or an animal), a physical object (e.g., car, building, etc.), a virtual-world character, or a virtual-world physical object.

In some embodiments, the exemplary illustrative methods and the exemplary illustrative systems of the present invention are specifically configured to apply one or more face alignment algorithms based on the fit of 3D face model(s), such as, but not limited to, 3D Morphable Model (3DMM), or a more general face model. In some embodiments, the exemplary illustrative methods and the exemplary illustrative systems of the present invention are specifically configured to utilize a database of a 3D synthetic faces to at least: 1) train a regressor, wherein a regressor may be any combination of at least two or more machine-learning algorithm including (but not limited to) random forest, boosting, or linear regression 2) fit in real-time a set of 3D parameters, including, but not limiting, camera angles, morphs, anthropometric parameters and/or lighting parameters, and 3) calculate a position (coordinates) for each or some of 2D landmark points. The term "anthropometric parameters" refers to a set of distinctive features of a user in terms of deviation of the user's three-dimensional face/head from the mean (averaged) face/head. The anthropometric parameters do not include emotions, facial expressions.

In some embodiments, the exemplary illustrative methods and the exemplary illustrative systems of the present invention are specifically configured to utilize a priority fitting order to fit various 3D parameters at certain stages of the regression processing. For example, in some embodiments, the exemplary illustrative methods and the exemplary illustrative systems of the present invention are specifically configured to fit 3D camera parameter(s) at the first stage, then 3D light source parameter(s), then morphs and eventually anthropometric coefficients. In some embodiments, a person skilled in the art could appreciate that the priority fitting order could be varied while still achieving sufficient accuracy equal to 0.06 of interpupillary distance measured as a mean error of all calculated 2D landmarks. In some embodiments, a person skilled in the art could appreciate that the priority fitting order could be varied while still achieving sufficient accuracy of at least 0.15 of interpupillary distance measured as a mean error of all calculated 2D landmarks. In some embodiments, a person skilled in the art could appreciate that the priority fitting order could be varied while still achieving sufficient accuracy of at least 0.10 of interpupillary distance measured as a mean error of all calculated 2D landmarks. In some embodiments, a person skilled in the art could appreciate that the priority fitting order could be varied while still achieving sufficient accuracy of at least 0.08 of interpupillary distance measured as a mean error of all calculated 2D landmarks. In some embodiments, a person skilled in the art could appreciate that the priority fitting order could be varied while still achieving sufficient accuracy of at least 0.06 of interpupillary distance measured as a mean error of all calculated 2D landmarks. In some embodiments, a person skilled in the art could appreciate that the priority fitting order could be varied while still achieving sufficient accuracy of at least 0.04 of interpupillary distance measured as a mean error of all calculated 2D landmarks. In some embodiments, a person skilled in the art could appreciate that the priority fitting order could be varied while still achieving sufficient accuracy of at least 0.02 of interpupillary distance measured as a mean error of all calculated 2D landmarks. In some embodiments, each 3D parameter has an associated weight so that the exemplary illustrative methods and the exemplary illustrative systems of the present invention are specifically configured to allow to adjust such weight at various stages of the regressing processing (e.g., at a transition point from one stage to another stage).

In some embodiments, region of interest(s) (ROIs) is/are determined during the initialization (the first application) of an exemplary face detection algorithm, such as the normalized pixel difference algorithm, as a rectangle area where face is detected in the image (e.g., the initial frame). Specifically, the exemplary algorithm processing module 206, utilizing the normalized pixel difference algorithm, would determine a size of the ROI. In some embodiments, the three-dimensional face model is created as a result of cascaded regressors. The three-dimensional face model may consist of a set of variables (latent variables) that define a user's head in three dimensions, such as position and rotation variables, variables and/or parameters for defining facial anthropometrics and mimics, etc. Also, the face model may be defined as a set of three- or two-dimensional landmarks. The face model may also be defined as a combination of these two definitions. The two- and three-dimensional landmarks and/or a face mesh may be also calculated based on the latent variables. For example, such derived set of two-dimensional landmarks may be the IBUG-68 landmarks.

The general equations of the cascaded regressor may be expressed as described above in the section "Illustrative examples of principles of present invention based on applying asymmetric cascades methodology."

In some embodiments, the exemplary illustrative methods and the exemplary illustrative systems of the present invention are specifically configured to utilize 3D face model(s) in which the facial expressions and anthropometry is separated from the 2D facial shape. In some embodiments, the exemplary illustrative methods and the exemplary illustrative systems of the present invention are specifically configured to utilize 3D face model(s) to model the light explicitly since all the parameters of a synthetic face database can be available. In some embodiments, a typical latent variables of the face model usually includes (1) a Principal Component Analysis (PCA) model of shape and one of color, (2) camera, and (3) a lighting model. To fit the face model to a 2D image, a cost function (e.g. as in Eq. 2 and 3 from the cascade section) is typically set up and optimized.

In some embodiments, the exemplary illustrative methods and the exemplary illustrative systems of the present invention are specifically configured to apply 3D face model(s) without utilizing the cascaded regression framework.

In some embodiments, an initial step of the inventive methodologies of the present invention is based on generating a 3D synthetic face database with a predefined set of parameters: facial expressions, anthropometric coefficients, camera model(s) and/or lighting model(s). In some embodiments, a subsequent step of the inventive methodologies of the present invention is based on training classifier(s) (i.e., a program configured to make classification decision(s) (i.e., using an object's characteristics to identify which class (or group) it belongs to) based on a value of a combination of predefined characteristics) and fit a real face image repeatedly by applying regressor(s) (i.e., independent variable(s) of a particular regression model) for fitting various set of parameters. In some embodiments, another subsequent step of the inventive methodologies of the present invention is based on calculating positions of projected 2D landmark points. In some embodiments, the exemplary illustrative methods and the exemplary illustrative systems of the present invention are specifically configured to utilize, for example, less number of particular landmarks points than are available under a particular landmark methodology (e.g., IBUG-68, LFPW-29, HELEN-194, etc.). For example, the inventive approaches of the present invention allow using less than the entire set of IBUG-68 landmark points. In some embodiments, the inventive approaches of the present invention allow using subsets consisting of 21, 52, and 64 IBUG-68 landmark points In some embodiments, the exemplary illustrative methods and the exemplary illustrative systems of the present invention are specifically configured to utilize any suitable landmark type (e.g., 2D landmarks, non-2D landmarks, etc.) and any suitable number of landmark points based, at least in part, on a minimum number of points needed to calculate the spatial orientation of a face. For example, in some embodiments, the number of points can vary from 5 to 3500. For example, in some embodiments, the number of points can vary from 6 to 3500. For example, in some embodiments, the number of points can vary from 7 to 3500. For example, in some embodiments, the number of points can vary from 8 to 3500. For example, in some embodiments, the number of points can vary from 9 to 3500. For example, in some embodiments, the number of points can vary from 10 to 3500. In some other embodiments, the number of points can vary from 5 to 500. In some other embodiments, the number of points can vary from 5 to 1000. In some other embodiments, the number of points can vary from 5 to 2000. In some other embodiments, the number of points can vary from 5 to 3000. In some other embodiments, the number of points can vary from 5 to 4000. In some other embodiments, the number of points can vary from 5 to 5000.

Table 4 provides an illustrative example of applying an exemplary face model modeling to face alignment in accordance with the present invention.

TABLE 4

Algorithm 1: Face Alignment with 3DMM.

Input: A set of frames in video sequence
Output: Face Model, Positions of 2D projected landmarks
Generate Face Dataset
Initialize Regressor, Face Model TABLE 4-continued Algorithm 1: Face Alignment with 3DMM.

Train Regressor on Face Dataset
For stage = 1...Number of Stages
    Assign Weights for fitting latent variables
    Update Face Model based on the previous Face Model and/or
    Weights
End
Calculate 3D landmarks and face mesh
Calculate 2D landmarks as a projection of 3D to 2D In some embodiments, for training classifier(s), the exemplary illustrative methods and the exemplary illustrative systems of the present invention are specifically configured to utilize an exemplary database of 3D synthetic faces which is based on or derived from a FaceGen library (https://facegen.com) by Singular Inversions Inc. (Toronto, CA). In some embodiments, the exemplary implementation of the present invention can be a C++ implementation of a command-line tool/application that can be run on, for example, the server 208. In some embodiments, the exemplary illustrative methods and the exemplary illustrative systems of the present invention are specifically configured to generate all parameter sets (e.g. larger ranges of tilt, roll, pan angles, etc.). In some embodiments, the train data can be in the form of a database of images coupled with xml description files.

In the illustrative example (Table 4) of applying the exemplary 3DMM modeling to face alignment in accordance with the present invention, the following parameters and functions are employed:
1) Latent Variables=[cameraModel, lighting, morphs, anthropometrics], where:
   i) lighting=[lightingx, lightingy, lightingz]+ambientLight;
   ii) morphs=[expressions (e.g. anger, fear, happiness, etc.), modifiers (e.g. browUp, EarsOut, etc.), phonemes (e.g. aah, i, k, etc.)];
   iii) anthropometrics=anthropometric deviation of a head from the mean shape;
2) Weights may be parameter(s) or function(s) or algorithm(s) introduced to reflect the impact of a particular latent variable in all variable set at a cascade;
3) Camera Model=[Model Matrix, View Matrix, Projection Matrix, Quaternion, Translates];
   i) Quaternion=[qw, qx, qy, qz];
   ii) Translates=[x, y] (in screen coordinates);
   iii) Model Matrix function transforms object coordinates to the world coordinates;
   iv) View Matrix function transforms the world coordinates to screen coordinates; and
   v) Projection Matrix applies camera projection (e.g. orthographic, perspective, etc.);

In some embodiments, the exemplary illustrative methods and the exemplary illustrative systems of the present invention are specifically configured to utilize at least one of the following methodologies to rebalance weights. In accordance with one methodology of the present invention, the exemplary illustrative methods and the exemplary illustrative systems of the present invention are specifically configured to assign constant weights, for example, but not limiting to, binary weights (0 or 1), so as to fit various sets of parameters at different stages of the regression processing. In a general case, weights may be either binary or floating-point numbers.

In accordance with one methodology of the present invention, to determine how many times to execute each cascade and which variable(s) to be used for fitting the regressor, the exemplary illustrative methods and the exemplary illustrative systems of the present invention are specifically configured to utilize one of hyperparameter optimization algorithms such as, but not limited to: grid search (search through a manually specified subset of the hyperparameter space of a learning algorithm), random search (random sampling parameter settings a fixed number of times), Bayesian optimization (consists of developing a statistical model of the function from hyperparameter values to the objective evaluated on a validation set), gradient-based optimization (for specific learning algorithms, it is possible to compute the gradient with respect to hyperparameters and then optimize the hyperparameters using gradient descent), evolutionary optimization (uses evolutionary algorithms to search the space of hyperparameters for a given algorithm), others (e.g. spectral methods).

In some embodiments, the exemplary illustrative methods and the exemplary illustrative systems of the present invention utilize hyperparameter optimization algorithms by assigning the regressor with a set of hyperparameters (e.g. the number of trees, the number of landmarks for calculating the local binary features, the tree depth, the number of cascades and weights of the parameters fitted at each cascade. The hyperparameter optimization algorithms finds the optimal set of hyperparameters (e.g. the minimal tree depth, the minimal number of cascades, or the optimal strategy for fitting variables at cascades, etc.) in order to keep the fitting error at the same level using Minimum Description Length technique (MDL), which is a principle for selecting the general form of a model and its parameters on the basis that any regularity in a given set of data can be used to compress the data.

As detailed herein, in some embodiments, the exemplary illustrative methods and the exemplary illustrative systems of the present invention are specifically configured to fit the sets/groups of parameters with weights that are rebalanced at each stage of the regression processing.

As detailed herein, in some embodiments, the exemplary illustrative methods and the exemplary illustrative systems of the present invention are specifically configured to utilize a directed lighting source vector as a feature for the regressor in order to improve the accuracy of face alignment. The vector is defined either in screen or model coordinate system and is determined by analyzing pixel values (brightness) of various parts of a face image. For example, one of methods is based on the comparison of brightness in symmetrical parts of the face.

As detailed herein, in some embodiments, the exemplary illustrative methods and the exemplary illustrative systems of the present invention are specifically configured not to utilize a 2D shape regression in the regression processing.

As detailed herein, in some embodiments, the exemplary illustrative methods and the exemplary illustrative systems of the present invention are specifically configured to determine/calculate 2D landmark points or/and 3D landmark points, or/and face mesh as an output.

A person skilled in the art would understand that, without violating the principles of the present invention detailed herein, in some embodiments, the exemplary illustrative methods and the exemplary illustrative systems of the present invention can be specifically configured to be utilized in any combination with one or more techniques, methodologies, and/or systems detailed herein.

Illustrative Examples of Non-Limiting Implementations of the Present Invention for Line-of-Sight (LOS) Tracking The Line-Of-Sight algorithm tracks position and attitude angles of a user's head and projects the line of sight vector onto a mobile device screen. Attitude angles may include pitch, roll, yaw, or, alternatively, quaternion representation.

While some illustrative examples of the present inventions detailed herein are directed to various methods and systems to track the LOS of a human within one or more regions of interest within visual image (e.g., a frame of streaming video), it is understood by a skilled artisan that such examples are merely illustrative in nature and are not limiting (e.g., the LOS of a non-human animal can be similarly tracked, or the LOS of a virtual character can be similarly tracked).

In some examples, the system may include a user presence logic module that may be communicatively coupled to the one or more processors and the one or more memory stores and that may be configured to determine whether at least one of the one or more users is present based at least in part on the received visual data, where the determination of whether at least one of the one or more users is present may occur in response to a determination that the application has been designated for operation with LOS (eye) tracking. The performance of the LOS (eye) tracking may occur in response to the determination that at least one user is present.

In some embodiments, the exemplary illustrative methods and the exemplary illustrative systems of the present invention are specifically configured to utilize the LOS (eye) tracking as part of a visual control methodology for enabling a use to control the operation of a program (e.g., a mobile application), a certain feature of the program (e.g., performing a certain action/activity with the program), an electronic device (e.g., smartphone) and/or a certain component of the electronic device (e.g., performing a certain action/activity with the electronic device) without using hands.

In some embodiments, the exemplary illustrative methods and the exemplary illustrative systems of the present invention are specifically configured to perform at least the following steps to track the LOS (eye) of a viewer:
a) receive the image data (e.g., a video sequence (202) from a front camera of a mobile device (204)),
b) process each frame to detect at least one face,
c) fit the detected face with an appropriate face model (the face model may consist of a set of variables or/and parameters that defines the three-dimensional model shape of a human's head; e.g. position, attitude, anthropometrics, mimics, or/and three- or/and two-dimensional landmarks),
d) calculate a camera model (including parameters such as, but not limited to, matrices, angles, translations and/or projections),
e) calculate an intersection of a normal facial vector with a screen plane,
f) normalize and re-scale 2D landmark point/position associated with the LOS "line-of-sight" so that its location at the screen edges corresponds to moderate angles of head rotation; and
g) apply either a moving average or a non-Gaussian space state filter to smoothen a trajectory of the LOS.

In some embodiments, a particular face model can be generated in the form of a 3D Morphable Model that may consist of a shape constructed from 3D face meshes that are in dense correspondence, that is, vertices with the same index in the mesh correspond to the same semantic point on each face. In 3DMM, a 3D shape is expressed as coordinates of the vertices. PCA is then applied to this data matrix consisting of stacked 3D face meshes. A face can then be approximated as a linear combination of the basis PCA coefficients. To estimate the pose of the 3D model, we select the parameters vector $\theta$ to be $\theta=[rx, ry, rz, tx, ty, tz]$, with rx, ry, and rz being the pitch, yaw and roll angle respectively, and tx, ty and tz the translations in 3D model space. We can then project a point in homogeneous xyz coordinates from 3D space to 2D using a standard perspective projection. From the full 3D model's mesh, we choose a subset of 3D vertices from the mean shape model in homogeneous coordinates. Given the current pose parameters $\theta$ we then project them onto the 2D image to obtain a set of 2D coordinates. Next, local features are extracted from the image around these projected 2D locations. These feature vectors are then concatenated to form one final feature vector, which is the output of $f(I, \theta)$ and the input for the regressor. As the cascaded regression method allows to estimate arbitrary parameters, we can apply it to estimating the shape parameters in local feature space as well. Our motivation is that the image data contains information about a face's shape, and we want to reconstruct the model's shape parameters for the subject in a given image. Similar, we select a number of 3D vertices, but instead of using the mean mesh, we generate a face instance using the current estimated shape coefficients and then use these identity-specific vertex coordinates to project to 2D space. More specifically, we construct a matrix by selecting the rows of the PCA basis matrix corresponding to the chosen vertex points. A face shape is then generated with this matrix and using current estimate of parameters. The parameter vector $\theta$ is then extended to incorporate the shape coefficients $\alpha$: $\theta=[rx, ry, rz, tx, ty, tz, \alpha]$.

Illustrative Examples Based on the Extended Face Model

In some embodiments, the output associated with the generated Extended face model can include an extended set of meta-parameters (e.g., Camera Model, Light Vector, Mimics, Emotions, Anthropometrics). In the subsequent step, the exemplary illustrative methods and the exemplary illustrative systems of the present invention are specifically configured to set the following vector (1) in the model coordinates:

$$\vec{f_M}=(0,0,1) \qquad (1).$$

In the subsequent steps, the exemplary illustrative methods and the exemplary illustrative systems of the present invention are specifically configured to transform the vector (1) to world coordinates (i.e., in a world coordinate system which is independent of the camera), determine screen coordinates, apply projection transformations, normalize and scale.

Figure 10:
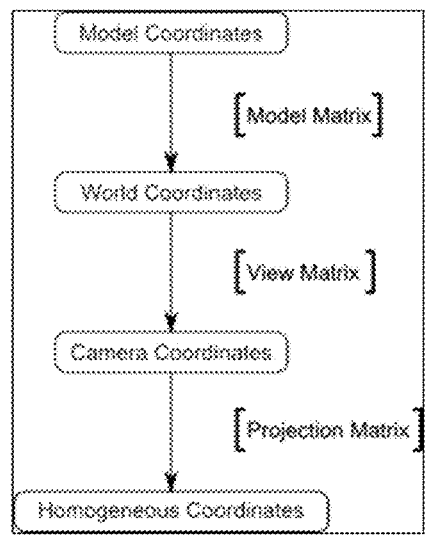
FIG. 10 shows an exemplary sequence of processing transitions from the model coordinates to the homogenous coordinates of the LOS point within a particular image consistent with some embodiments of the present invention.

FIG. 10 shows an exemplary sequence of processing transitions from the model coordinates to the homogenous coordinates of the LOS point within a particular image (e.g., a frame of the streaming video). Specifically, with respect to FIG. 10, a skilled artisan would appreciate the following as detailed in Table 5.

TABLE 5

| Model Coordinate System |
|---|
| The Model Coordinate System is simply the coordinate system where the model was created. For example, model created using Blender. http://www.blender.org/(Blender Foundation, Amsterdam, the Netherlands). |
| World Coordinate System |
| A Model Coordinate System is the unique coordinate space of the model. Two distinct models, each with their own coordinate systems can't interact with each other. There needs to be a universal coordinate system that allows each model to interact with each other. This universal system |

TABLE 5-continued is called World Coordinate System. For interaction to occur, the coordinate system of each model is transformed into the World Coordinate System.
Camera Coordinate System What is seen on a screen is relative to a viewer. More specifically to a camera. A change in a camera's orientation and position changes what a viewer sees. A World Coordinate System is transformed into a coordinate system called Camera Coordinate System. This coordinate space defines what it is seen on a screen.
Projective (Homogeneous) Coordinate System What is perceived on a screen as three dimensional is just an illusion. It is just a two dimensional image. The final transformation in the graphics pipeline (e.g., the programmable graphics pipeline) occurs in what is called the Projective Coordinate System. This transformation converts a three dimensional scenery into a two dimensional image.
The Projective coordinate system can be configured in two ways:
Perspective View, and
Orthogonal View.

Perspective View

When the projective's coordinate system is set as a Perspective View, it gives the illusion of producing a three dimensional scenery. This is an illusion created by producing a vanishing point and making objects farther from the camera smaller, thus producing the illusion of depth. This is the view typically used in 3D images (e.g., 3D games).
Orthogonal View In Orthogonal View, every object in the scene is seen as a two-dimensional objects. There is no illusion of depth. This is the view typically used in images (e.g., 2D games).

Table 6 provides an illustrative example of the sequence of the processing steps that the exemplary illustrative methods and the exemplary illustrative systems of the present invention can be specifically configured to execute in accordance with the present invention.

TABLE 6

```
std::vector<int> getLineOfSightCoordinates(frx_camera_position cameraPosition,
        int verticalResolution, int horizontalResolution){
    1. Initialize variables:
    std::vector<int> coordinates(3);          // Screen coordinates
    std::vector<float> Mn(4);                 // modelViewMatrix * normalToFace
    float z0 = 1.0f;                          // normalToFace in model coordinates
    float yOffset = 0.0f;
    2. Calculate product modelViewMatrix * normalToFace:
    Mn[0] = cameraPosition.model_view_m[2] * z0;
    Mn[1] = cameraPosition.model_view_m[6] * z0;
    Mn[2] = cameraPosition.model_view_m[10] * z0;
    Mn[3] = cameraPosition.model_view_m[14] * z0 + yOffset;
    3. Calculate screen coordinates of the point:
    float x = cameraPosition.projection_m[0] * Mn[0] + cameraPosition.projection_m[1] *
            Mn[1] + cameraPosition.projection_m[2] * Mn[2] + cameraPosition.projection_m[3] *
            Mn[3];
    float y = cameraPosition.projection_m[4] * Mn[0] + cameraPosition.projection_m[5] *
            Mn[1] + cameraPosition.projection_m[6] * Mn[2] + cameraPosition.projection_m[7] *
            Mn[3];
    float z = cameraPosition.projection_m[8] * Mn[0] + cameraPosition.projection_m[9] *
            Mn[1] + cameraPosition.projection_m[10] * Mn[2] + cameraPosition.projection_m[11]
            * Mn[3];
    4. Apply projection(s) and scale:
    coordinates[0] = (int) (- z0 / z * x * cameraPosition.frustum_r * horizontalResolution *
horizontalScale);
    coordinates[1] = (int) (- z0 / z * y * cameraPosition.frustum_t * verticalResolution *
verticalScale);
    5. Apply restrictions:
    if (coordinates[0] > horizontalResolution/2){
        coordinates [0] = horizontalResolution/2;
            } else if (coordinates [0] < -horizontalResolution/2){
                coordinates[0] = -horizontalResolution/2;
    };
    if (coordinates[1] > verticalResolution/2){
            coordinates[1] = verticalResolution/2;
    } else if (coordinates[1] < -verticalResolution/2){
            coordinates[1] = -verticalResolution/2;
    };
        6. Translate axis origin to the upper-left corner:
            coordinates [0] = coordinates [0] + horizontalResolution/2;
    coordinates [1] = coordinates[1] + verticalResolution/2;
    7. Apply smoothing filter:
    Coordinates = smoothingFilter(coordinates);
        8. Return:
            return coordinates;
}
```

Figure 11:
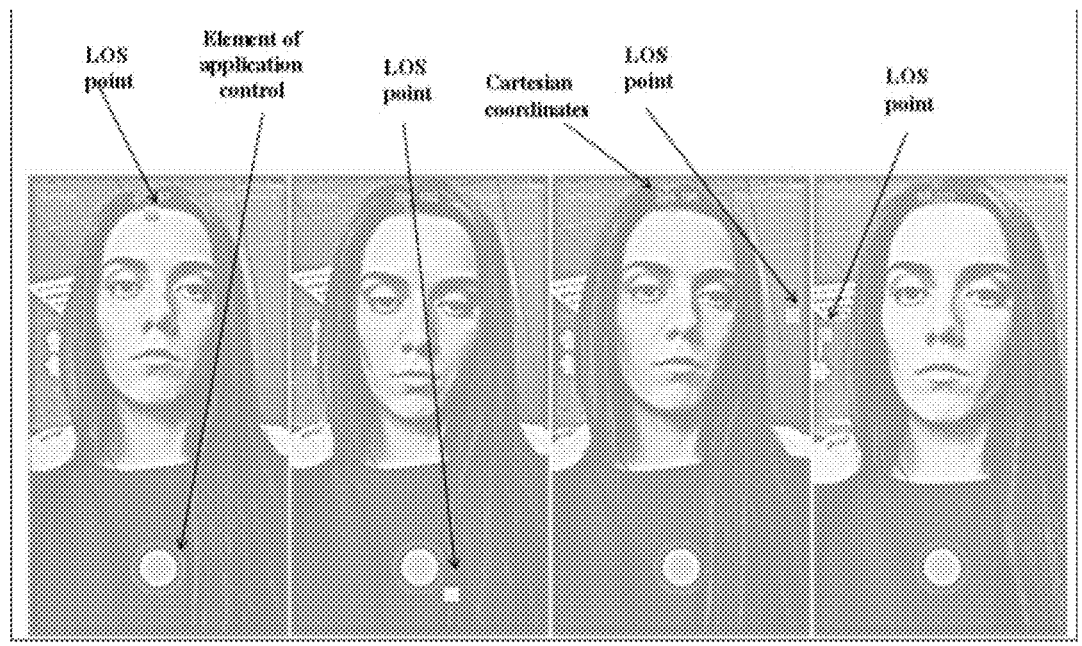
FIG. 11 shows a snapshot of results of the LOS (eye) tracking in the set of video frames consistent with some embodiments of the present invention.

FIG. 11 shows results of the LOS (eye) tracking in the set of video frames, processed in accordance with the exemplary algorithm of Table 6. Specifically, in FIG. 11, each rectangle identifies the intersection of the line-of-sight (LOS) with the screen plane of a mobile device (e.g., smartphone), running a mobile device application. In FIG. 11, the screen's Cartesian coordinates are displayed above each image. In FIG. 11, circles at the bottom of each frame identify an element of application control.

In Table 6, at step 4, the exemplary algorithm utilized the orthographic projection to achieve the results of the LOS (eye) tracking in FIG. 11. In some embodiments, at step 4, the exemplary illustrative methods and the exemplary illustrative systems of the present invention can be specifically configured to utilize the prospective projection.

In Table 6, at step 4, the exemplary algorithm utilized the scale to account for an unknown distance between the camera and a viewer. In Table 6, at step 4, the exemplary algorithm utilized the scale so that rotation angles are within ±10 degrees. In some embodiments, at step 4, the exemplary illustrative methods and the exemplary illustrative systems of the present invention can be specifically configured to utilize a suitable scale so that rotation angles are within ±X degrees, where X varies from 1 to 20. In some embodiments, X varies from 1 to 10. In some embodiments, X varies from 1 to 15. In some embodiments, X varies from 5 to 10. In some embodiments, X varies from 5 to 15. In some embodiments, X varies from 5 to 20. In some embodiments, X varies from 10 to 20.

As detailed herein, in some embodiments, the exemplary illustrative methods and the exemplary illustrative systems of the present invention are specifically configured to perform the LOS (eye) tracking based on a particular face model, a particular projection, and a particular scaling methodology.

In some embodiments, a smoothing filter, as used in Table 6 step 7, could be any suitable spatial or temporal filter including but not limited to moving average, exponential moving average, low-pass filter, and Kalman filter. In some embodiments, for example the Kalman filter can be applied in a two-step process. In the prediction step, the Kalman filter produces estimates of the current state variables, along with their uncertainties. Once the outcome of the next measurement (necessarily corrupted with some amount of error, including random noise) is observed, these estimates are updated using a weighted average, with more weight being given to estimates with higher certainty. The algorithm is recursive. It can run in real time, using only the present input measurements and the previously calculated state and its uncertainty matrix; no additional past information is required While a number of embodiments of the present invention have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other. Further still, the various steps may be carried out in any desired order (and any desired steps may be added and/or any desired steps may be eliminated).

REFERENCE NUMBERS 100 environment
102 user
104 mobile device
106 server
200 invention
204 camera
202 live video stream
206 algorithm module
208 remote data processing server
210 output module

We claim:

1. A method, comprising:
    obtaining, by at least one processor, a plurality of sequential visual representations having a face of at least one subject;
    applying, by the at least one processor, a face detection algorithm to detect an initial presence of the face of the at least one subject within an initial visual representation of the plurality of sequential visual representations;
    wherein the initial visual representation is a first visual representation in which the initial presence of the face of the at least one subject has been detected for a first time in the plurality of sequential visual representations;
    wherein the initial presence of the face of the at least one subject within the initial visual representation is defined by a first plurality of initial conditions;
    constructing, by the at least one processor, a first face model of the face of the at least one subject based, at least in part, on the first plurality of initial conditions;
    wherein the initial presence of the face of the at least one subject is detected once prior to the constructing of the first face model;
    tracking, by the at least one processor, the face of the at least one subject in at least one subsequent visual representation of the plurality of sequential visual representations, by executing one or more times at least the following:
        i) modifying one or more initial conditions of the first plurality of initial conditions to generate a plurality of subsequent face models where each subsequent face model is a prediction of how the face of the at least one subject would appear in the at least one subsequent visual representation; and
        ii) applying at least one special filter to each subsequent face model of the plurality of subsequent face models to generate a plurality of updated subsequent face models;
    determining, by the at least one processor, one of:
        i) a refined subsequent face model from the plurality of updated subsequent face models or
        ii) a lack of the refined subsequent face model;
        wherein the refined subsequent face model is a predictive face model that adequately represents a respective presence of the face of the at least one subject in the at least one subsequent visual representation of the plurality of sequential visual representations;
    outputting, by the at least one processor, a second plurality of initial conditions to be utilized for tracking the face of the at least one subject in at least one next subsequent visual representation of the plurality of sequential visual representation;
    wherein the second plurality of initial conditions is:
        i) a third plurality of initial conditions that is representative of the refined subsequent face model within the at least one subsequent visual representation; or
        ii) a fourth plurality of initial conditions that is representative of a second face model that has been constructed, based, at least in part, on the fourth plurality of initial conditions determined after the lack of the refined subsequent face model has been determined; and wherein the fourth plurality of initial conditions has been determined by applying the face detection algorithm to the at least one subsequent visual representation to detect the respective presence of the face of the at least one subject in the at least one subsequent visual representation of the plurality of sequential visual representations.

2. The method of claim 1, wherein each plurality of initial conditions comprises:
  i) respective face positional data, being representative of a respective position of the face of the at least one subject within a respective visual representation, and
  ii) respective face model data, comprising at least one of:
    1) a plurality of initial latent variables or
    2) a plurality of initial multi-dimensional points.

3. The method of claim 1, wherein the respective face positional data comprises one or more initial regions-of-interest (ROI).

4. The method of claim 1, wherein the one or more times is between 2 and 25 times.

5. The method of claim 1, wherein the plurality of subsequent face models are uncorrelated subsequent face models.

6. The method of claim 1, wherein the at least one subject is a person.

7. The method of claim 1, wherein the plurality of sequential visual representations comprises at least one of:
  i) a plurality of frames of a video input,
  ii) a plurality of images, or
  iii) a combination of one or more frames of the video input and one or more images.

8. The method of claim 7, wherein the video input is a real-time video stream.

9. The method of claim 8, wherein the real-time video stream is a live video stream.

10. The method of claim 1, wherein the plurality of sequential visual representations is obtained by utilizing a camera of a portable electronic device.

11. The method of claim 10, wherein the at least one processor is a processor of the portable electronic device.

12. The method of claim 1, wherein the modifying one or more initial conditions of the first plurality of initial conditions is modifying one or more initial conditions of the first plurality of initial conditions in a pre-determined manner.

13. The method of claim 1, wherein the determining that the refined subsequent face model adequately represents the respective presence of the face of the at least one subject in the at least one subsequent visual representation of the plurality of sequential visual representations is based, at least in part, on testing a stability of the refined subsequent face model over a number of landmark points.

14. The method of claim 13, wherein the number of landmark points is based on a particular landmark methodology.

15. A system comprising:
a portable electronic device having a camera, wherein the camera is configured to acquire a plurality of sequential visual representations having a face of at least one subject;
a non-transient computer memory storing software instructions; and
at least one processor configured, when executing one or more of the software instructions, to perform at least the following:

obtaining a plurality of sequential visual representations having a face of at least one subject;

applying a face detection algorithm to detect an initial presence of the face of the at least one subject within an initial visual representation of the plurality of sequential visual representations;

wherein the initial visual representation is a first visual representation in which the initial presence of the face of the at least one subject has been detected for a first time in the plurality of sequential visual representations;

wherein the initial presence of the face of the at least one subject within the initial visual representation is defined by a first plurality of initial conditions;

constructing a first face model of the face of the at least one subject based, at least in part, on the first plurality of initial conditions;

wherein the initial presence of the face of the at least one subject is detected once prior to the constructing of the first face model;

tracking the face of the at least one subject in at least one subsequent visual representation of the plurality of sequential visual representations, by executing one or more times at least the following:
  i) modifying one or more initial conditions of the first plurality of initial conditions to generate a plurality of subsequent face models where each subsequent face model is a prediction of how the face of the at least one subject would appear in the at least one subsequent visual representation; and
  ii) applying at least one special filter to each subsequent face model of the plurality of subsequent face models to generate a plurality of updated subsequent face models;

determining one of:
  i) a refined subsequent face model from the plurality of updated subsequent face models or
  ii) a lack of the refined subsequent face model;
  wherein the refined subsequent face model is a predictive face model that adequately represents a respective presence of the face of the at least one subject in the at least one subsequent visual representation of the plurality of sequential visual representations;

outputting a second plurality of initial conditions to be utilized for tracking the face of the at least one subject in at least one next subsequent visual representation of the plurality of sequential visual representation;

wherein the second plurality of initial conditions is:
  i) a third plurality of initial conditions that is representative of the refined subsequent face model within the at least one subsequent visual representation; or
  ii) a fourth plurality of initial conditions that is representative of a second face model that has been constructed, based, at least in part, on the fourth plurality of initial conditions determined after the lack of the refined subsequent face model has been determined; and wherein the fourth plurality of initial conditions has been determined by applying the face detection algorithm to the at least one subsequent visual representation to detect the respective presence of the face of the at least one subject in the at least one subsequent visual representation of the plurality of sequential visual representations.

16. The system of claim 15, wherein each plurality of initial conditions comprises:
  i) respective face positional data, being representative of a respective position of the face of the at least one subject within a respective visual representation, and
  ii) respective face model data, comprising at least one of:
    1) a plurality of initial latent variables or
    2) a plurality of initial multi-dimensional points.

17. The system of claim 15, wherein the respective face positional data comprises one or more initial regions-of-interest (ROI).

18. The system of claim 15, wherein the one or more times is between 2 and 25 times.

19. The system of claim 15, wherein the plurality of subsequent face models are uncorrelated subsequent face models.

20. The system of claim 15, wherein the at least one subject is a person.

21. The system of claim 15, wherein the plurality of sequential visual representations comprises at least one of:
  i) a plurality of frames of a video input,
  ii) a plurality of images, or
  iii) a combination of one or more frames of the video input and one or more images.

22. The system of claim 21, wherein the video input is a real-time video stream.

23. The system of claim 15, wherein the modifying one or more initial conditions of the first plurality of initial conditions is modifying one or more initial conditions of the first plurality of initial conditions in a pre-determined manner.

24. The system of claim 15, wherein the determining that the refined subsequent face model adequately represents the respective presence of the face of the at least one subject in the at least one subsequent visual representation of the plurality of sequential visual representations is based, at least in part, on testing a stability of the refined subsequent face model over a number of landmark points.

25. The system of claim 24, wherein the number of landmark points is based on a particular landmark methodology.

* * * * *